(12) United States Patent
Ganz et al.

(10) Patent No.: US 8,790,183 B2
(45) Date of Patent: Jul. 29, 2014

(54) ARCADE IN A VIRTUAL WORLD WITH REWARD

(75) Inventors: Howard Ganz, North York (CA); Felix Leung, Toronto (CA)

(73) Assignee: GANZ, Woodbridge, Ontariio ( * ) Notice: Subject to any disclaimer, the term of this patent is extended or adjusted under 35 U.S.C. 154(b) by 0 days.

(21) Appl. No.: 13/397,074

(22) Filed: Feb. 15, 2012

(65) Prior Publication Data

US 2012/0208624 A1    Aug. 16, 2012

Related U.S. Application Data

(60) Provisional application No. 61/442,994, filed on Feb. 15, 2011.

(51) Int. Cl.
*A63F 9/24* (2006.01)
(52) U.S. Cl.
USPC .............................................. 463/42; 463/25
(58) Field of Classification Search
USPC .................... 463/25, 29, 32, 37, 42
See application file for complete search history.

(56) References Cited

U.S. PATENT DOCUMENTS

| | | | |
|---|---|---|---|
| 5,768,382 A | 6/1998 | Schneier et al. |
| 6,219,045 B1 | 4/2001 | Leahy et al. |
| 6,267,672 B1 | 7/2001 | Vance |
| 6,321,211 B1 | 11/2001 | Dodd |
| 6,368,177 B1 | 4/2002 | Gabai et al. |
| 6,396,509 B1 | 5/2002 | Cheng |
| 6,468,155 B1 | 10/2002 | Zucker et al. |
| 6,476,830 B1 | 11/2002 | Farmer et al. |
| 6,493,001 B1 | 12/2002 | Takagi et al. |
| 6,559,863 B1 | 5/2003 | Megiddo |
| 6,616,532 B2 | 9/2003 | Albrecht |
| 6,663,105 B1 | 12/2003 | Sullivan et al. |
| 6,734,885 B1 | 5/2004 | Matsuda |
| 6,739,941 B1 | 5/2004 | Brownsberger |
| 6,758,746 B1 | 7/2004 | Hunter et al. |
| 7,012,602 B2 | 3/2006 | Watson et al. |
| 7,054,831 B2 | 5/2006 | Koenig |
| 7,058,897 B2 | 6/2006 | Matsuda |
| 7,092,899 B2 | 8/2006 | Simas et al. |
| 7,139,796 B2 | 11/2006 | Rekimoto et al. |
| 7,143,358 B1 | 11/2006 | Yuen |

(Continued)

FOREIGN PATENT DOCUMENTS

| | | |
|---|---|---|
| GB | 2365364 | 2/2002 |
| JP | 2001222585 | 8/2001 |

(Continued)

OTHER PUBLICATIONS

English language Abstract for JP 2002007926 A.*

(Continued)

*Primary Examiner* — William Brewster
*Assistant Examiner* — Jason Skaarup
(74) *Attorney, Agent, or Firm* — Pearne & Gordon LLP (57) ABSTRACT

Virtual world website allows customizing characters by purchasing items for the characters using virtual cash. The virtual cash is in the first currency format. A user can also link to another website, for example a second website, which allows earning cash in a second currency format different than the first currency format. The second website allows converting virtual currency into the first currency format. Embodiments allow multiple different currency conversions.

4 Claims, 5 Drawing Sheets

(56) References Cited

U.S. PATENT DOCUMENTS

| | | |
|---|---|---|
| 7,155,680 B2 | 12/2006 | Akazawa et al. |
| 7,210,104 B2 | 4/2007 | Nakagawa et al. |
| 7,246,073 B2 | 7/2007 | Kinoshita |
| 7,266,511 B2 | 9/2007 | Teshima |
| 7,266,522 B2 | 9/2007 | Dutta et al. |
| 7,288,028 B2 | 10/2007 | Rodriquez et al. |
| 7,314,407 B1 | 1/2008 | Pearson |
| 7,412,526 B2 | 8/2008 | Fujisawa |
| 7,429,214 B2 | 9/2008 | Brase et al. |
| 7,442,108 B2 | 10/2008 | Ganz |
| 7,467,096 B2 | 12/2008 | Antonucci et al. |
| 7,548,242 B1 | 6/2009 | Hughes et al. |
| 7,556,563 B2 | 7/2009 | Ellis et al. |
| 7,587,338 B2 | 9/2009 | Owa |
| 7,593,864 B2 | 9/2009 | Shuster |
| 7,690,990 B2 * | 4/2010 | Van Luchene ................ 463/25 |
| 7,823,074 B2 | 10/2010 | Takemura et al. |
| 8,088,002 B2 | 1/2012 | Ganz |
| 2002/0007313 A1 | 1/2002 | Mai et al. |
| 2002/0022994 A1 | 2/2002 | Miller et al. |
| 2002/0029179 A1 | 3/2002 | Gruber et al. |
| 2002/0040327 A1 | 4/2002 | Owa |
| 2002/0046109 A1 | 4/2002 | Leonard et al. |
| 2002/0143652 A1 | 10/2002 | Beckett |
| 2002/0161666 A1 | 10/2002 | Fraki et al. |
| 2002/0169672 A1 | 11/2002 | Barnhart |
| 2003/0046157 A1 | 3/2003 | Prorock |
| 2003/0055984 A1 | 3/2003 | Shimakawa et al. |
| 2003/0126031 A1 | 7/2003 | Asami |
| 2004/0093266 A1 | 5/2004 | Dohring |
| 2004/0093302 A1 | 5/2004 | Baker et al. |
| 2004/0189702 A1 | 9/2004 | Hlavac et al. |
| 2004/0193489 A1 | 9/2004 | Boyd et al. |
| 2004/0249735 A1 | 12/2004 | Cassani et al. |
| 2005/0027626 A1 | 2/2005 | Garcia |
| 2005/0059483 A1 | 3/2005 | Borge |
| 2005/0137015 A1 | 6/2005 | Rogers et al. |
| 2005/0177428 A1 | 8/2005 | Ganz |
| 2005/0192864 A1 | 9/2005 | Ganz |
| 2005/0222906 A1 | 10/2005 | Chen |
| 2006/0093142 A1 | 5/2006 | Schneier et al. |
| 2006/0123127 A1 | 6/2006 | Littlefield |
| 2006/0178976 A1 | 8/2006 | Vu |
| 2006/0208074 A1 | 9/2006 | Eglen et al. |
| 2007/0050716 A1 | 3/2007 | Leahy et al. |
| 2007/0073582 A1 | 3/2007 | Jung et al. |
| 2007/0082720 A1 | 4/2007 | Bradbury et al. |
| 2007/0088656 A1 | 4/2007 | Jung et al. |
| 2007/0099685 A1 | 5/2007 | Van Luchene |
| 2007/0111770 A1 | 5/2007 | Van Luchene |
| 2007/0112624 A1 | 5/2007 | Jung et al. |
| 2007/0130001 A1 | 6/2007 | Jung et al. |
| 2007/0149285 A1 | 6/2007 | Osnato et al. |
| 2007/0219874 A1 | 9/2007 | Toulotte |
| 2007/0250403 A1 | 10/2007 | Altschuler |
| 2008/0070690 A1 * | 3/2008 | Van Luchene et al. ......... 463/42 |
| 2008/0261687 A1 | 10/2008 | Gatzios |
| 2008/0288343 A1 | 11/2008 | Ho et al. |
| 2009/0063282 A1 | 3/2009 | Ganz |
| 2009/0069084 A1 | 3/2009 | Reece et al. |
| 2009/0125819 A1 | 5/2009 | Hamilton, II et al. |
| 2009/0131164 A1 | 5/2009 | Ganz |
| 2009/0132267 A1 * | 5/2009 | Ganz ................................. 705/1 |
| 2009/0132357 A1 * | 5/2009 | Ganz ............................... 705/14 |
| 2009/0132656 A1 * | 5/2009 | Ganz ............................. 709/205 |
| 2009/0144638 A1 | 6/2009 | Haggar et al. |
| 2009/0204420 A1 | 8/2009 | Ganz |
| 2009/0254843 A1 | 10/2009 | Van Wie et al. |
| 2009/0318229 A1 | 12/2009 | Zielinski et al. |
| 2010/0030660 A1 | 2/2010 | Edwards |
| 2010/0151940 A1 | 6/2010 | Borge |
| 2010/0227675 A1 * | 9/2010 | Luxton et al. .................... 463/25 |
| 2010/0306228 A1 | 12/2010 | Carpenter et al. |
| 2011/0124403 A1 * | 5/2011 | Clark et al. ...................... 463/25 |
| 2012/0197692 A1 * | 8/2012 | Ganz et al. ................... 705/14.1 |

FOREIGN PATENT DOCUMENTS

| | | | |
|---|---|---|---|
| JP | 2001321571 | 11/2001 | |
| JP | 2001522498 | 11/2001 | |
| JP | 2002007926 A * | 1/2002 | ............. G06F 17/60 |
| JP | 2002055935 A | 2/2002 | |
| JP | 2002063092 | 2/2002 | |
| WO | 9942917 | 8/1999 | |
| WO | 0227591 | 4/2002 | |

OTHER PUBLICATIONS

Erica Naone, Moving Freely Between Virtual Worlds:, Technology Review (MIT, Oct. 29, 2007).

Real-Money Trade of Virtual Assets: Ten Different User Perceptions—Vili Lehdonvirta (2005).

Tech titans seek virtual-world interoperability—Daniel Terdiman (Oct. 13, 2007).

Virtual Economics: Applying Economics to the Study of Game Worlds—Vili Lehdonvirta (2005).

* cited by examiner

ARCADE IN A VIRTUAL WORLD WITH REWARD

This application claims priority from provisional application No. 61/442,994, filed Feb. 15, 2011, the entire contents of which are herewith incorporated by reference.

BACKGROUND

Our U.S. Pat. No. 7,421,569, filed Dec. 30, 2004 discusses a system of interacting with a virtual representation of a real world product. According to this system, a user can buy a toy such as 100 which is associated with a special code 105. The toy 100 exists in the real world, and the code 105 forms a key to the virtual world 110. The user enters the code 105 on a website and enters the virtual world 110.

The virtual world 110 provides activities and views with which the user can interact. The virtual world 110, as part of the interaction, provides a virtual replica 115 of the actual toy 100. Users can carry out various activities on the website using their virtual version of the toy. For example, the user can form a house with rooms, furniture, things, clothing, and other things. The user can also carry out activities to earn virtual cash, and purchase virtual items using that cash.

Our co-pending application Ser. No. 11/942,301 filed Nov. 19, 2007, describes transfers of rewards between websites. The disclosure of this application is hereby incorporated by reference in its entirety.

SUMMARY

Techniques of transferring credits between websites that use different virtual currency format. In one embodiment, if the user is logged into one website when playing on another website, credits earned from the playing can be automatically converted into another form and/or transferred.

In another embodiment users are given options for different conversions to different virtual currency formats.

Another embodiment recognizes that sites such as this are financed by advertising, and automatically refreshes the advertisements during multiple different steps of converting the virtual currency from one form to another.

BRIEF DESCRIPTION OF THE DRAWINGS

FIG. 2 shows a main website which has information including a news portion, and shows how the news portion can be configured and linked to;

DETAILED DESCRIPTION

Figure 1:
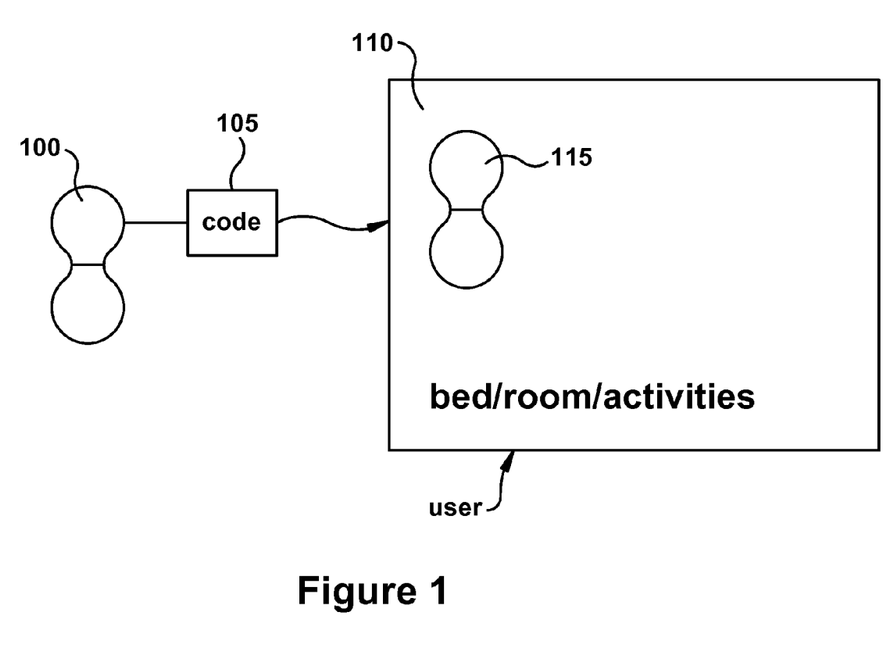
FIG. 1 shows entering a code on a website to obtain a virtual version of the item on the website.

The present application describes additional aspects, actions and activities and additional structure, for interacting with a website of the type described in our co-pending application, and as shown generally in FIG. 1. It should be understood, however, that the aspects described herein are not limited to use with the system described in FIG. 1, e.g., the Webkinz™ website. These aspects can be used with other kinds of websites, for example, any website that allows user interaction to be used with this system. An embodiment describes new operations using the website illustrated in FIG. 1.

In the embodiment, and in websites such as the Webkinz® website, users carry out activities to earn virtual cash that is usable on the website. The virtual cash can be used to purchase items that are usable on the website, e.g., virtual food, virtual furniture, virtual clothing or other items.

Our co-pending application Ser. No. 11/942,301 describes how different virtual worlds may take different forms of virtual cash. The term virtual cash is used herein to represent any kind of virtual cash or virtual credits that can buy items on the website. In one embodiment, the virtual cash can be used by virtual items on the website. For example, a user may have a virtual item (e.g., a virtual character the user controls on the website) that can be enhanced by other virtual items on the website, such as virtual clothing, accessories, and the like. However, the different virtual websites may use different forms of virtual cash. For example, one website called "Ganz World" may accept one form of virtual cash (here Ganz World dollars) and another website called Webkinz World may take a different form of virtual cash (here KinzCash).

Another embodiment includes an arcade on the website, called the "Ganz World Arcade". The Ganz World Arcade provides games. Any user, with an account or without an account, is allowed to visit this site and play those games. According to an embodiment, playing the games provides virtual cash for winning those games, and optionally for merely participating in such games. If the user is logged into their user account (on the Ganz World arcade), that user accumulates Ganz World currency from playing the games. If that user is not logged in, then that user does not accumulate that currency. This provides the advantage that anyone can play on the arcade, but users are encouraged to join the site. Once a user joins the site, that user obtains login and password information and a user account is created for the user.

As explained herein, the currency that is obtained for playing a game or otherwise performing one or more actions on a website can also be used on one or more other websites.

Figure 2:
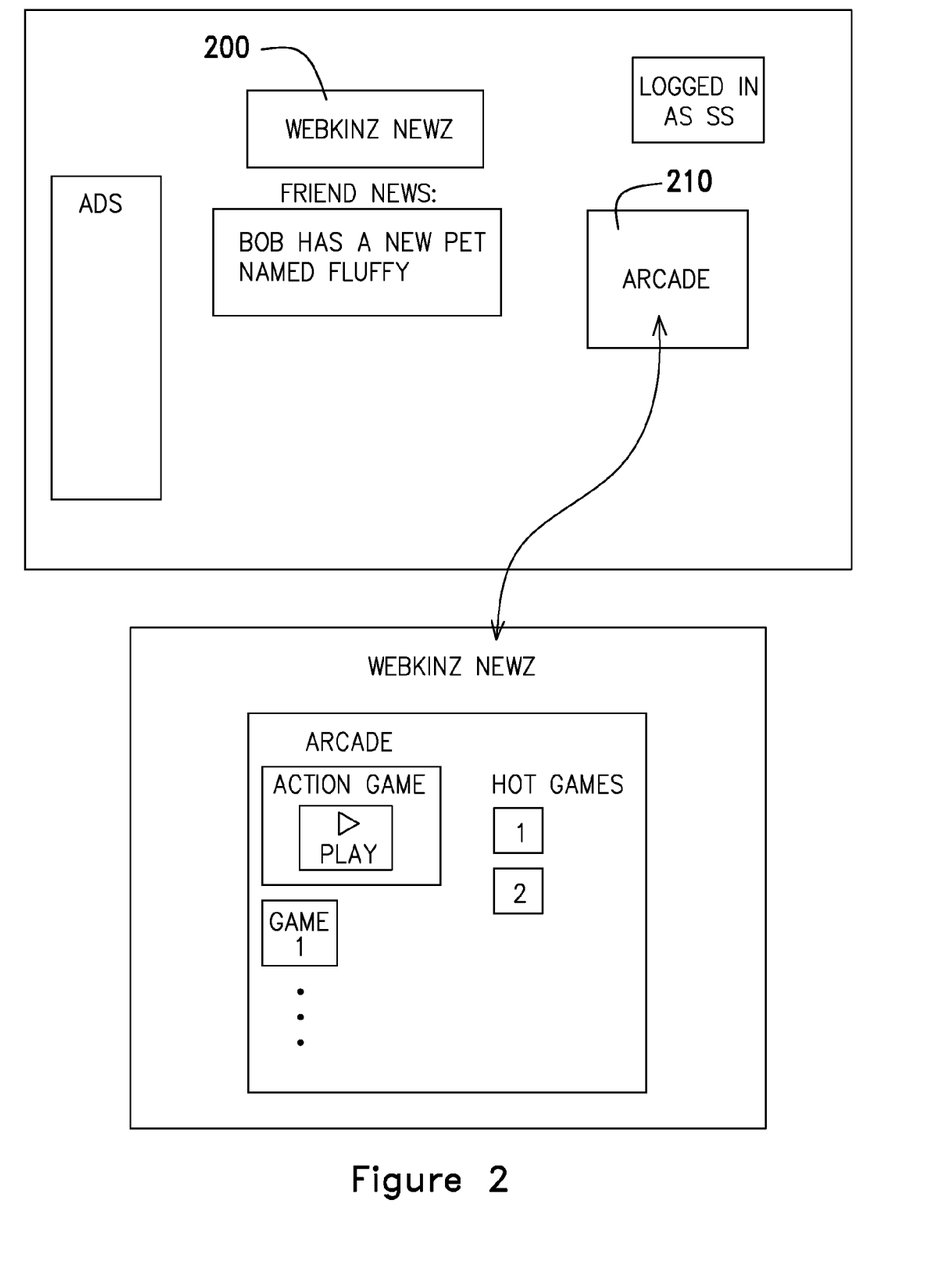

The site can also include, or be part of, a news section 200, called "Webkinz Newz". This section informs users about different aspects of the website such as recent changes to the website, activities on the website, acquaintances on the website, etc. . . . For example, this can be used within a social networking site and can also have ads and other landing sections.

As shown in FIG. 2, the user can gain access to the arcade by selecting the selection 210 appearing on the website displayed by a monitor or other suitable display device provided to a user computer using a web browser application, for example. In this embodiment, the arcade opens inside of Webkinz Newz. However, in another embodiment, the arcade may be a wholly separate website. In one embodiment, a user can control and customize characters within a virtual world, the "Webkinz World" website. The arcade may be linked to from the Webkinz World website, or can be part of the Webkinz World website.

Once the arcade has been started or accessed by a user the user is presented with at least one, and optionally a plurality of arcade games from which to choose.

According to an embodiment, however, the Webkinz Newz site can be used with any of a number of different sites referred to herein, including the Ganz World site, the Webkinz site, Tail Towns™ site, and others. The Webkinz Newz site, as shown for example at the bottom of FIG. 2 and in FIG. 3, allows users to play games in the arcades. Users playing games in the arcades receive virtual currency for playing those games. This encourages users to use the site.

When the users use the site more often, they also view more advertisements. Accordingly, the users receive this virtual currency to encourage them to be on the site more often and by so doing, to enhance the advertising revenue of the site.

Each of the different associated websites may have different kinds of currency, each of which are virtual currency of the type described above allows purchasing items for virtual characters on the website, such as the Webkinz World website. According to another embodiment, the virtual currency can be used to purchase other kinds of items. The websites (e.g., Ganz World and Webkinz World) are said to be "associated" in that each website has a connection to the other. For instance, each website can optionally be operated by, or on behalf of a common entity, or operated by, or on behalf of different entities that are related (e.g., subsidiaries of a common parent) or otherwise affiliated. According to another embodiment, each website can optionally be operated by, or on behalf of different entities that have entered into an agreement, whether formal or informal, to allow the use of virtual cash in one website on another of the websites.

The above has described how some features will pay out Ganz World currency (GW currency) in the arcade.

Another embodiment detects the website to which the user is logged in. By detecting that a user is logged into Ganz World when participating in a game accessed via the the Webkinz Newz site as described below, the site is caused to automatically pay out GW currency. According to one embodiment, the system may pay out a different kind of currency than its local currency if the user is logged into the other website. For example, if the user is logged into the Webkinz World website and plays an arcade game in the Webkinz Newz website accessed from the Ganz World website, the games pay out KinzCash (native cash of the Webkinz World website) instead of GW Currency.

In a similar and analogous way, games which are being played on the Ganz World website can pay out KinzCash when the user is logged into Webkinz World while playing on the Ganz World website.

Figure 3:
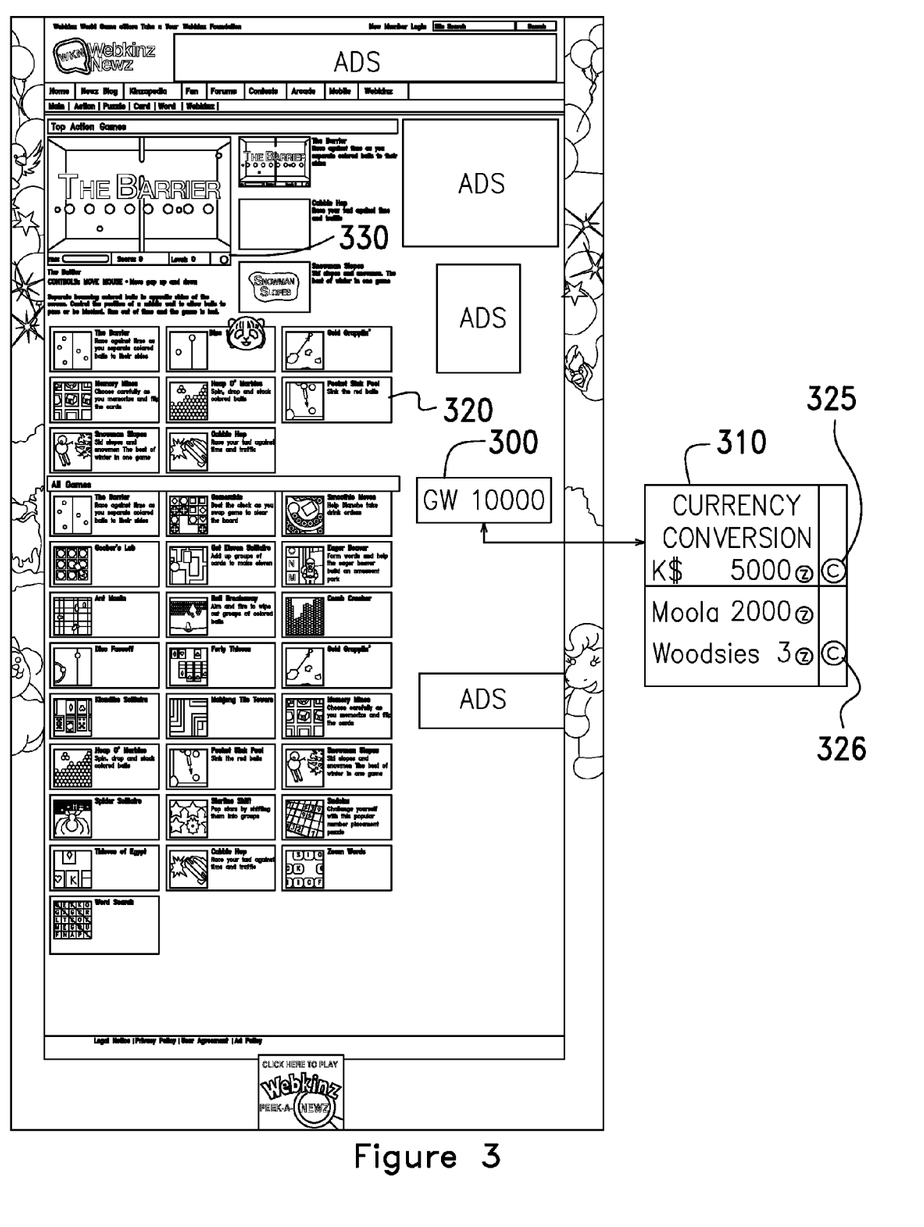
FIG. 3 shows an arcade with exemplary currency conversions.

If the user is logged into any website, the rewards/virtual cash that they win for playing the games can be converted. Here, the user is shown logged into the Ganz World website, thereby receiving Ganz World credits shown as 300. Clicking on those Ganz World credits brings up a currency conversion screen shown as 310 which shows the users the different ways that they can convert this currency. Clicking on any conversion will allow conversion of the currency to a different virtual currency format. For example, 310 shows one option to be converting to KinzCash, which can be effected by clicking on the convert icons 325. The amount would then be converted to KinzCash. If the user is logged on to Webkinz World, which accepts the KinzCash, then the currency may be either manually transferred or automatically transferred to that site.

FIG. 3 shows a number of different game icons, which can optionally appear in different sizes. The small game icons such as 320 are ~70×60 pixel preview icons. These icons are used in many places. Medium game icons at 330 are primarily used in the top panel, when these are brought into focus. Larger game icons of ~290×200 px can also be used as shown as 410 in FIG. 4.

In the embodiment, as described above, the native currency for the arcade may be Ganz World currency, which would normally be shown as 300. However, when the user is logged into a different website, here Webkinz World, instead of GW Currency, KinzCash is displayed as 400 in FIG. 4. 405 shows a message that the user is logged in. Note also that in FIG. 4, the user has selected a game, which here is shown in the large pixel format.

Many different games can be shown in the arcade, as shown in FIG. 3. Players can immediately select any game shown on this page by clicking its icon, or game name, or description.

Players can jump to a category page by selecting Category name in the top bar, or the Category name in the Content area, or the "More Games" text link in the game category box.

Figure 4:
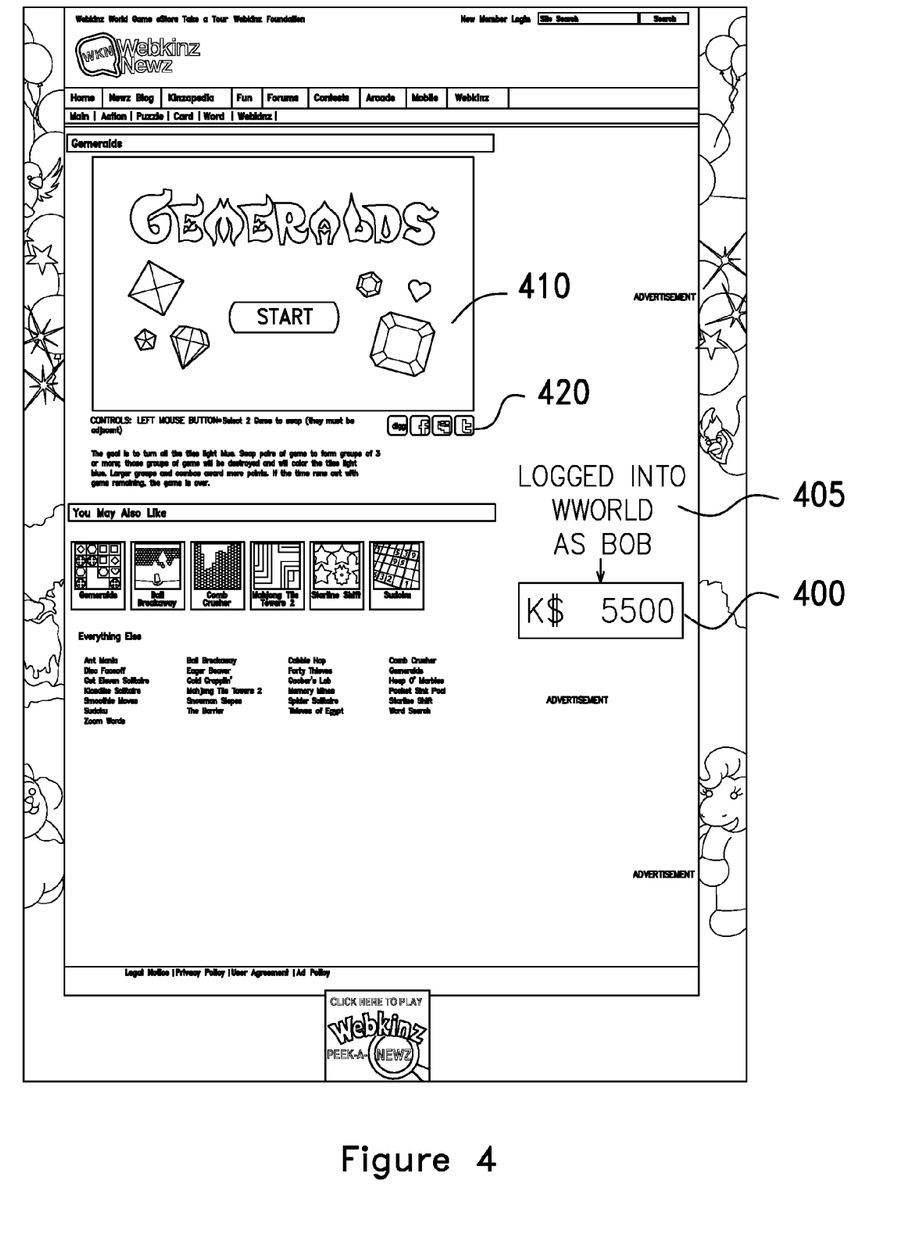
FIG. 4 shows the specific game, and a currency conversion form.

To the right of the description and controls are small Share icons 420. When pressed, these buttons will "Share" the game on the respective site, e.g, for Digg, Facebook, Twitter. Close to the Facebook Share icon, there is also a Facebook "Like" icon which adds this game to your FB Likes list.

In one embodiment, the users may be limited in the amount of cash that they can accumulate in any one day. This may be set as the variable ERRORMAXTOTALCASHDAY. When this variable is exceeded, the display of amount of cash changes to "You have reached the maximum amount of {GW Currency} that you can earn today."

According to another embodiment, the system may check for cheating tools, and if finding a cheating tool, the variable ERRORCHEATENGINE is set. Rather than the user seeing an amount of cash that they have earned at that point, the display of amount of cash changes to "An error has occurred."

Another limit may be on the maximum amount of virtual cash that a user can transfer in any one day. For example, this may be set as a variable called ERRORMAXTRANSFERDAY. When this variable is exceeded, a message is displayed indicating "You have reached the maximum transfer amount".

Note that all attempts to carry out any action will refresh everything on the site, including ads.

If the player tried to transfer 0 currency, a message is displayed that "There are no funds to transfer." A Continue button appears. Pressing that Continue button closes this overlay and restarts the game. This also refreshes the ads.

Note that each time any attempt (or success) at converting virtual cash or credits from one form to another, and/or transferring virtual cash or credits occurs, the ads refresh. Therefore, in addition to allowing the user to transfer these funds from one form/type to the other, the conversion and the transfer also cause refresh of the ads. Therefore, this encourages actions taken by the user that causes the user to view new ads, and thereby can also increase the ad revenue.

If there is any error between the request from Webkinz Newz to Webkinz, e.g., a server error, there is a message "An error has occurred". There is a Retry and a Cancel Transfer button. If Retry is pressed, the "waiting" graphic reappears as a second transfer is attempted. If Cancel Transfer is pressed, then it closes this overlay and restarts the game. This also refreshes the ads.

A "Cancel Transfer" button. Pressing this button closes the overlay and restarts the game. This also refreshes the ads.

One aspect of the present system includes security protection from hacking tools and tools like Cheat Engine, so that a player cannot modify the game score.

Right before the player is shown their final score, a Game Stat is submitted to the server system. This Game Stat contains the following information:

UserID
GameID
Total Score (the total score of the game. This is usually the score displayed to the player in-game)
Immediate Score (the score the player has earned in this specific game play. The player is never shown this score. This is used to calculate payout at the end of game)

Level (if applicable, the level the player was on when the game finished)

Time (in Seconds)

Win Flag (0-User quit the game, 1-User lost the game in games you can lose, 2-User won or successfully completed the game, 3-Cheat Engine error detection). These stats are to be used for the Game Stats system. In one embodiment, this Stat is sent at the end of the game. In that embodiment, if the event the game/browser/computer crashes during gameplay the information will not be sent to the system, meaning the player does not receive a payout for that game. Another embodiment can use interim updates during the game.

After the server receives the Game Stat, the server checks the amount of {GW Currency} to give out based on the player's score and the payout logic for the game set in The Admin System.

The server awards the earned currency as per the above. For example, if the user is logged in, the currency may automatically be awarded in the native currency of the website to which the user is logged in. The user can also transfer the currency to another site using the converting and transferring tool.

In an embodiment, this page can be accessed by the player clicking on their {GW Currency} amount in the upper right of the screen, or from clicking the button in the User Information Page.

Using the Basic Layout, the following is in the content section of the page:

Main Screen

This page displays the following:

How much {GW Currency} the logged-in user has.

The conversion ratio for the different associated sites, for example:

{GW Currency} to KinzCash

{GW Currency} to Moola

{GW Currency} to Woodsies

Note these are displayed even if the user does not have a membership to these accounts.

To the right of the conversion ratios above, there is a small Information button icon. On mouse-over, a tooltip appears with text:

KinzCash: "If you have a Webkinz World account linked to your GanzWorld account, you can convert and transfer your {GW Currency} into KinzCash."

Moola: "If you have an Amazing World account linked to your Ganz World account, you can convert and transfer your {GW Currency} into Moola."

Woodsies: "If you have a Tail Towns account linked to your Ganz World account, you can convert and transfer your {GW Currency} into Woodsies."

To the right of the Info buttons above, there is either:

A "Convert and Transfer" button 325 if the player has attached an account for this currency. Note that account Attachments are done in the User Information Page.

A "Link Account" button 326 if the player does not have an account attached for this currency. Pressing this button leads to the Account Attachment section in the User Information Page.

It is assumed that player has pressed a "Convert and Transfer" button above. A pop-up appears, displaying the following:

"You are about to transfer [KinzCash/Woodsies/Moola] to a [Tail Towns/Webkinz/Amazing World] account."

"How much do you want to transfer?"

"To which account?" Next to this is a drop-down menu which contains all the linked accounts that a user have for this site. By default, it is blank (user needs to select an account). If the user only has 1 account linked they don't see a drop-down menu (just the account).

"[x] {GW Currency}" and a field to enter an amount, "[y] [Other Currency]" and a field to enter an amount.

A "Transfer to my account" button (active/inactive states)

A "Clear" button

There is a button "View Conversion Log" pressing this opens up an overlay:

This displays a user's most recent conversions, for each transaction it has the time/date, the amount converted ({GW Currency} and the other currency), the site it went to and the Account ID.

If the player enters in an amount into one of the fields, the other field is automatically updated with the converted amount. This activates the "Transfer" button.

If the player presses the active "Transfer" button (conversion amount already entered), the system passes to the Confirmation Screen.

If the player presses the "Clear" button, the fields are cleared and the "Transfer" button goes to the inactive state.

Each time any action of this type is taken, the player sees this pop-up confirmation if they pressed the "Transfer to my account" button above. The pop-up displays the following:

"You are about to transfer [amount in other currency] [currency name] to account [ID] in [site]."

"Previous {GW Currency}: [previous GW currency amount]. New amount: [new GW Currency amount].

"Once transferred, this cannot be undone."

"Confirm Transfer?"

Yes button and Cancel button.

Pressing "Cancel" goes back to the Converting Currency Main Screen.

Pressing "Confirm" begins the transfer. The items displayed above disappear, replaced by a "waiting" graphic.

If the transfer is successful, there is a message "Transfer Successful". A continue button appears and pressing it brings the person back to the Converting Currency Main Screen.

If there was a system/server error, there is a message "Could not do the transfer. Please try again later". A Continue button appears and pressing it brings the person back to the Converting Currency Main Screen.

If there was an ERRORMAXTRANSFERDAY error, there is a message "You have reached the max transfer amount. Please try later". A Continue button appears and pressing it brings the person back to the Converting Currency Main Screen. See Admin System/Security Systems for details.

If there was an ERRORACCOUNTFROZEN error, there is a message "An error has occurred. Please contact Customer Service". A Continue button appears and pressing it brings the person back to the Converting Currency Main Screen. See Admin System/Security Systems for details.

If the player tried to transfer 0 currency, there is a message "There are no funds to transfer". A Continue button appears and pressing it closes this overlay and restarts the game. This also refreshes the ads.

If there was an error between the request from Ganz World Arcade to Webkinz (server error), there is a message "An error has occurred". There is a Retry and a Cancel Transfer button. If Retry is pressed, the "waiting" graphic reappears as a second transfer is attempted. If Cancel Transfer is pressed, then it closes this overlay and restarts the game. This also refreshes the ads.

This section describes the movement of currency within the Ganz World Arcade. When you play a game in the Ganz World Arccade, at the end of the game the player has a score. A player receives {GW Currency} at the end of the game; the amount of {GW Currency} received depends on the score and the game. The exact amount of {GW Currency} earned is set in the Admin System (see "The Admin System" for details).

The {GW Currency} earned is put into the user's account. There is a page where the player can convert their {GW Currency} into currencies that are usable on other sites (KinzCash, Moola, Woodsies, etc). The ratio from {GW Currency} to the other currencies is displayed. These ratios are set in the Admin System. The player can convert as much or as little of their {GW Currency} as they want.

If the player is logged in, on every screen on the arcade the player will see their ID on the page, and next to their ID is how much {GW Currency} is currently in their account.

The game may also include a limit of maximum payout ratio based on the variable (MAXPAYOUTRATIO): This is the maximum payout ratio of any game ({GW Currency}/min). When a game starts, it sends a signal to the server that it has started. When the game is over the Game Stat is sent. The server calculates the time the game took, and compares it to the calculated payout. The game payout cannot be higher than the MAXPAYOUTRATIO.

Background info for examples below: VARA=0.5 VARB=1.0 MAXPAYOUTRATIO=20.0

EXAMPLE 1

1. User starts game at exactly 1:13:36 pm (HR:MIN:SEC). A message is sent to the server.
2. User loses game at exactly 1:15:01 pm. The Game Stat is submitted to server.
   a. Immediate Score in Game Stat is 17780.
   b. Based on the payout formula, payout is calculated to be 9 {GW Currency}.
   c. The server calculates that the game took 1.42 minutes.
   d. The MAXPAYOUTRATIO is calculated to be Floor (1.42*20)=28 {GW Currency}
   e. Since the payout is lower than MAXPAYOUTRATIO (everything is OK), 9 {GW Currency} is awarded.

EXAMPLE 2

1. User starts game at exactly 1:20:01 pm (HR:MIN:SEC). A message is sent to the server.
2. User loses game at exactly 1:20:15 pm. The Game Stat is submitted to server.
   a. Immediate Score in Game Stat is 17780.
   b. Based on the payout formula, payout is calculated to be 9 {GW Currency}.
   c. The server calculates that the game took 0.23 minutes.
   d. The MAXPAYOUTRATIO is calculated to be Floor (0.23*20)=4 {GW Currency}
   e. Since the payout is HIGHER than MAXPAYOUTRATIO, the 4 {GW Currency} MAXPAYOUTRATIO is awarded (instead of 9). There is no special/error messaging, the user is simply told they are awarded 4 {GW Currency} payout.
   f. Even though the user receives no error message, ERRORMAXPAYOUTRATIO is recorded in the Security System Logger (see sect 2.5.2).

Exemplary current site variables include conversion factors (e.g., GW cash to KinzCash, 1000: Limit of the amount of Currency an Account can earn, per day 500: Limit of the amount of Currency an Account can transfer, per day The Webkinz site may also have a news area that provides different news pieces about things on the Webkinz site and also tells you about what other users on the website are doing. The news part on the website is in essence a "things to do" site.

One of the things that a user can do on the website is to win credits on one site and use those credits as virtual cash on other sites. For example, the Newz site may link to an arcade game that lets you win credits on the one site, and use them on some other site. Consider the example of Webkinz World and Ganz World. Users can play an arcade game on Ganz World, and use the credits from that arcade game on Webkinz World. Webkinz Newz can lead you to an arcade game on Ganz World that you could play in order to get the credits and use them on Webkinz World.

The user can play the games on or linked to the Newz site whether the user is logged in or not. However, if the user is logged in, then the games will give the user the opportunity to transfer the credits somewhere else. For example, a user who is registered in Ganz World, wins KinzCash for Ganz World from the arcade. As long as the user is logged in, when the user finishes playing this will say to you "you got 120 KinzCash—would you like to transfer it to Ganz World?"

Figure 5:
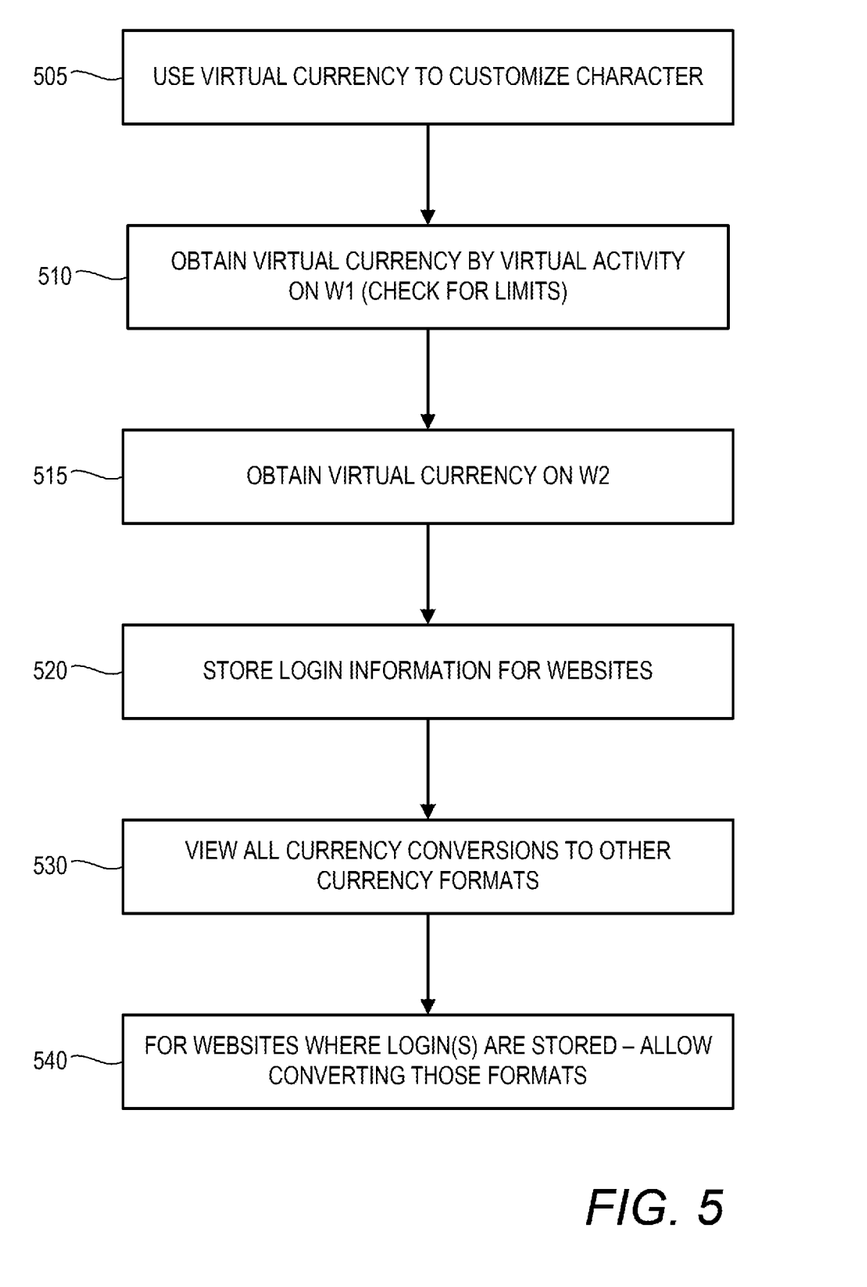
FIG. 5 shows a flowchart of operation.

All of these actions are illustrated in the flowchart of FIG. 5 which illustrates the actions of the user interacting with the computer as shown in FIG. 1. 505 shows the user using the virtual currency to customize the character. 510 shows the user obtaining the virtual currency by taking actions on the website including virtual activities. 510 also shows checking for the limits, as described above. 515 shows obtaining virtual currency on a separate website shown as W-2. 520 shows converting the currencies from the first currency format to the second currency format and storing them and refreshing ads.

A second embodiment is that a user can get a specified kind of cash for example GW cash. The system then asks "would you like to transfer your GW cash to Webkinz World or Tail Towns or . . . " provided that the user's ID for one of those sites is linked to the IDs for the other site.

Another embodiment is that a user finds something else on the site and transfers that to the site.

This provides special advantages when used along with a virtual world site where items can be interacted with on the site, and may also provide special advantages from a site like Webkinz where products are purchased in the real world, those purchase products have a code that is uniquely indicative of those products, and entering the code causes the virtual version of the product to be registered.

The general structure and techniques, and more specific embodiments which can be used to effect different ways of carrying out the more general goals are described herein.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other items can be purchased and received in this way. Other kinds of virtual currency can also be used.

Also, the inventor intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A method comprising:
a user interfacing with a computer that maintains a virtual world on a virtual world website, including virtual characters that are manipulable by the user;
said user controlling customizing at least one of said virtual characters using the computer using items that can be obtained on the virtual world web site by using virtual currency on the virtual world website, to obtain the items, where the virtual currency on the virtual world website is in a first currency format;
carrying out a first action on said computer to interface with said virtual world website, and to interact with a virtual activity on the virtual world website, and to obtain said virtual currency on the virtual world web site in the first currency format for participating in said virtual activity;
said user interacting from the computer with a separate website separate from the virtual world website, and interacting with a second virtual activity on the separate website, where said separate website uses a second virtual currency which is in a second currency format that is different than the first currency format and where said interacting with the second virtual activity provides the user with said second virtual currency on the separate web site in the second currency format;
said user logging in to the virtual world website and receiving an ability to convert said virtual currency from said second currency format to the first currency format and transfer said virtual currency to said virtual world website; and
said user using the transferred virtual currency to customize said at least one of said virtual characters,
wherein said user interacts with said separate website and receives plural different options for converting said virtual currency from said second currency format to multiple different currency formats usable on multiple different web sites,
further comprising storing on the separate website user login information for the user on said multiple different websites,
wherein the user can only convert to those of said multiple currency formats for which the separate website has said user login information from the computer, but can view conversions for all of said multiple currency formats from the computer.

2. The method as in claim 1, wherein said website shows advertisements.

3. The method as in claim 2, wherein said advertisements are automatically refreshed each time the user takes any action to convert the virtual currency from the second currency format to the first currency format.

4. A method comprising:
on a computer, receiving inputs from a user to perform an interaction with a first virtual activity on a website, where said website uses virtual currency which is in a first currency format, and where said interaction with the first virtual activity provides the user with said virtual currency in the first currency format;
showing advertisements on said website on the computer;
providing a control on the computer, which when selected, shows options for converting said virtual currency to another virtual currency format of another website, wherein selecting said control refreshes said advertisements, and where said control also allows converting to said another virtual currency, and transferring the converted currency to another website, and where said converting and said transferring each cause the advertisements to be refreshed, and where said control also allows operations on said computer for converting to said another virtual currency, and transferring the converted currency to another website, and where said converting and said transferring each cause the advertisements to be refreshed, wherein said control provides options on said computer for converting from said virtual currency format to a plurality of different currency formats usable on a plurality of different websites; and
storing on the another website user login information for the user on said plurality of different web sites,
wherein the user can only convert to those of said plurality of different currency formats for which the another website has said user login information, but can view conversions for all of said plurality of different currency formats.

* * * * *

UNITED STATES PATENT AND TRADEMARK OFFICE
CERTIFICATE OF CORRECTION

Page 1 of 1

PATENT NO.         : 8,790,183 B2
APPLICATION NO.    : 13/397074
DATED              : July 29, 2014
INVENTOR(S)        : Howard Ganz et al.

It is certified that error appears in the above-identified patent and that said Letters Patent is hereby corrected as shown below:

Title Page, Item (73), Assignee, "Ontariio" should read --Ontario--

In the Specification,

Column 8, starting at line 30, "converting the currencies from the first currency format to the second currency format and storing them and refreshing ads." should read --storing on the separate website user login information for the user on the multiple different websites. The user can view conversions for all of the multiple currency formats from the computer shown as 530. However, the user can only convert to those of the multiple currency formats for which the separate website has the user login information from the computer as shown in 540.--

Signed and Sealed this
Thirteenth Day of January, 2015

Michelle K. Lee
*Deputy Director of the United States Patent and Trademark Office*